US009982761B2

(12) United States Patent
Ma et al.

(10) Patent No.: US 9,982,761 B2
(45) Date of Patent: May 29, 2018

(54) TENSIONER WITH IMPROVED DAMPING

(71) Applicant: Litens Automotive Partnership, Woodbridge (CA)

(72) Inventors: Wei Ma, Richmond Hill (CA); Kacy E. Joseph, Brampton (CA)

(73) Assignee: Litens Automotive Partnership, Woodbridge, ON (CA)

( * ) Notice: Subject to any disclaimer, the term of this patent is extended or adjusted under 35 U.S.C. 154(b) by 111 days.

(21) Appl. No.: 14/889,209

(22) PCT Filed: May 14, 2014

(86) PCT No.: PCT/CA2014/000429
§ 371 (c)(1),
(2) Date: Nov. 5, 2015

(87) PCT Pub. No.: WO2014/183200
PCT Pub. Date: Nov. 20, 2014

(65) Prior Publication Data
US 2016/0146313 A1 May 26, 2016

Related U.S. Application Data

(60) Provisional application No. 61/822,914, filed on May 14, 2013.

(51) Int. Cl.
*F16H 7/12* (2006.01)
*F16H 7/08* (2006.01)
*B60K 25/02* (2006.01)

(52) U.S. Cl.
CPC ......... *F16H 7/1245* (2013.01); *F16H 7/0829* (2013.01); *F16H 7/1218* (2013.01);
(Continued)

(58) Field of Classification Search
CPC ............. F16H 2007/081; F16H 7/1218; F16H 2007/084; F16H 7/1281; F16H 2007/0893
(Continued)

(56) References Cited

U.S. PATENT DOCUMENTS 4,723,934 A    2/1988  Thomey
5,334,109 A *  8/1994  Izutsu ................... F16H 7/1218
                                                            474/135
(Continued)

FOREIGN PATENT DOCUMENTS

CA       2851318 A1    5/2013
CN     101680515 A     3/2010
(Continued)

OTHER PUBLICATIONS

International Search Report and First Written Opinion for PCT/CA2014/000429, dated Aug. 1, 2014, ISA.
(Continued)

*Primary Examiner* — Henry Y Liu
(74) *Attorney, Agent, or Firm* — Millman IP Inc.

(57) ABSTRACT

In an aspect, a tensioner for tensioning an endless drive member on an engine, is provided, comprising a base that mounts to the engine, a tensioner arm that is pivotally connected to the base for pivotal movement about a tensioner arm axis, a pulley rotatably mounted to the tensioner arm for rotation about a pulley axis that is spaced from the tensioner arm axis, a tensioner spring and a damping member. The tensioner spring is positioned to urge the tensioner arm into an endless drive member. The spring has a first helical end and a second helical end. The first helical end is positioned to transfer force with a first spring end force transfer surface on the base and the second helical end is positioned to transfer force with a second spring end force transfer surface on the tensioner arm. The damping member (Continued)

is positioned in a surrounding relationship with the tensioner spring. The damping member includes a spring force adjustment member having a first end face and a second end face spaced from the first end face by a selected angular spacing. The damping member includes a first portion that contains the spring force adjustment member and that is generally rigid, and at least one second portion that is adjacent the first member and that is flexibly joined to the first member. The spring force adjustment member is positioned between one of the spring ends and one of the spring end force transfer surfaces on one of the base and the tensioner arm. The damping member is frictionally engaged with the other of the base and the tensioner arm during pivotal movement of the tensioner arm relative to the base.

13 Claims, 11 Drawing Sheets

(52) U.S. Cl.
CPC .. *B60K 2025/022* (2013.01); *F16H 2007/081* (2013.01); *F16H 2007/084* (2013.01); *F16H 2007/0893* (2013.01)

(58) Field of Classification Search
USPC .......................................................... 474/135
See application file for complete search history.

(56) References Cited

U.S. PATENT DOCUMENTS

| | | | | |
|---|---|---|---|---|
| 5,470,280 A * | 11/1995 | Ayukawa | ............. | F16H 7/1218 474/135 |
| 5,540,627 A * | 7/1996 | Miyata | ................. | F16H 7/1218 474/112 |
| 5,632,697 A * | 5/1997 | Serkh | .................... | F16H 7/1218 474/109 |
| 5,647,813 A * | 7/1997 | Serkh | .................... | F16H 7/1218 474/101 |
| 5,772,549 A * | 6/1998 | Berndt | .................. | F16H 7/1281 474/135 |
| 5,935,032 A * | 8/1999 | Bral | ...................... | F16H 7/1218 474/117 |
| 5,938,552 A * | 8/1999 | Serkh | .................... | F16H 7/1218 474/117 |
| 6,231,465 B1 * | 5/2001 | Quintus | ................ | F16H 7/1218 474/101 |
| 6,250,693 B1 | 6/2001 | Gensert et al. | | |
| 6,262,578 B1 | 7/2001 | Ayukawa | | |
| 6,361,459 B1 | 3/2002 | Serkh et al. | | |
| 6,468,172 B1 * | 10/2002 | Lang | ..................... | F16H 7/1218 474/135 |
| 6,582,332 B2 * | 6/2003 | Serkh | .................... | F16H 7/1218 474/109 |
| 6,592,484 B1 | 7/2003 | Serkh | | |
| 6,609,988 B1 * | 8/2003 | Liu | ....................... | F16H 7/1218 474/133 |
| 6,743,132 B2 | 6/2004 | Serkh | | |
| 6,767,303 B2 * | 7/2004 | Ayukawa | ............. | F16H 7/1218 474/135 |
| 6,991,570 B2 | 1/2006 | Serkh | | |
| 7,004,863 B2 * | 2/2006 | Serkh | .................... | F16H 7/1218 474/109 |
| 7,004,865 B2 * | 2/2006 | Berndt | .................. | F16H 7/129 474/109 |
| 7,090,606 B2 | 8/2006 | Dec | | |
| 7,104,909 B2 | 9/2006 | Asbeck et al. | | |
| 7,186,196 B2 * | 3/2007 | Quintus | ................ | F16H 7/1218 474/135 |
| 7,226,377 B2 * | 6/2007 | Kraus | ................... | F16H 7/1209 474/117 |
| 7,367,908 B2 | 5/2008 | Lemberger et al. | | |
| 7,371,199 B2 * | 5/2008 | Joslyn | ................... | F16H 7/1218 474/135 |
| 7,419,447 B2 | 9/2008 | Serkh | | |
| 7,530,911 B2 | 5/2009 | Serkh | | |
| 7,597,639 B2 * | 10/2009 | Serkh | .................... | F16H 7/1218 474/109 |
| 7,678,002 B2 * | 3/2010 | Joslyn | ................... | F16H 7/1218 474/135 |
| 7,803,078 B2 * | 9/2010 | D'Silva | ................. | F16H 7/1218 474/112 |
| 7,887,445 B2 * | 2/2011 | Quintus | ................ | F16H 7/1218 474/109 |
| 7,946,938 B2 * | 5/2011 | Hallen | .................. | F16H 7/1218 474/112 |
| 7,952,030 B2 | 5/2011 | Ward et al. | | |
| 8,038,555 B2 * | 10/2011 | Pendergrass | .......... | F16H 7/1218 188/82.4 |
| 8,075,433 B2 * | 12/2011 | Quintus | ................ | F16H 7/1218 474/135 |
| 8,100,793 B2 * | 1/2012 | D'Amicantonio | .... | F16H 7/1218 474/135 |
| 8,123,640 B2 * | 2/2012 | Quintus | ................ | F16H 7/1218 474/135 |
| 8,162,787 B2 * | 4/2012 | Gerring | ................ | F16H 7/1236 188/82.84 |
| 8,272,983 B2 * | 9/2012 | Rolando | ............... | F16H 7/1218 474/112 |
| 8,277,348 B2 * | 10/2012 | Lannutti | ............... | F16H 7/1218 474/135 |
| 8,292,765 B2 * | 10/2012 | Rolando | ............... | F16H 7/1245 184/6.17 |
| 8,337,344 B2 * | 12/2012 | Meano | .................. | F16H 7/1218 474/109 |
| 8,403,785 B2 * | 3/2013 | Lannutti | ............... | F16H 7/1218 474/135 |
| 8,439,781 B2 * | 5/2013 | Lannutti | ............... | F16H 7/1218 474/135 |
| 8,460,140 B2 * | 6/2013 | Joslyn | ................... | F16H 7/1218 192/105 CD |
| 9,005,061 B2 * | 4/2015 | Liebel | ................... | F16H 7/1218 474/112 |
| 2003/0008739 A1 * | 1/2003 | Asbeck | ................ | F16H 7/1218 474/135 |
| 2003/0069098 A1 * | 4/2003 | Serkh | .................... | F16H 7/1218 474/135 |
| 2003/0216204 A1 * | 11/2003 | Serkh | .................... | F16H 7/1218 474/135 |
| 2004/0014542 A1 * | 1/2004 | Quintus | ................ | F16H 7/1218 474/135 |
| 2004/0171448 A1 * | 9/2004 | Lemberger | ............ | F16H 7/1218 474/135 |
| 2005/0003915 A1 * | 1/2005 | Dec | ........................ | F16H 7/1281 474/135 |
| 2005/0043131 A1 * | 2/2005 | Asbeck | ................ | F16H 7/1218 474/135 |
| 2005/0059518 A1 * | 3/2005 | Joslyn | ................... | F16H 7/1218 474/135 |
| 2006/0079360 A1 * | 4/2006 | Jung | ..................... | F16H 7/1218 474/135 |
| 2006/0172837 A1 * | 8/2006 | Quintus | ................ | F16H 7/1218 474/135 |
| 2006/0258497 A1 * | 11/2006 | Dec | ........................ | F16H 7/1218 474/112 |
| 2006/0293135 A1 * | 12/2006 | Quintus | ................ | F16H 7/1218 474/135 |
| 2007/0010361 A1 * | 1/2007 | Kobelev | ............... | F16H 7/1218 474/115 |
| 2007/0021253 A1 * | 1/2007 | Kobelev | ............... | F16H 7/1218 474/135 |
| 2007/0142148 A1 * | 6/2007 | Joslyn | ................... | F16H 7/1218 474/135 |
| 2008/0058140 A1 * | 3/2008 | Gerring | ................ | F16H 7/1236 474/133 |
| 2008/0058141 A1 * | 3/2008 | Pendergrass | .......... | F16H 7/1218 474/135 |

(56) References Cited

U.S. PATENT DOCUMENTS

| | | | |
|---|---|---|---|
| 2008/0058142 A1* | 3/2008 | Joslyn | F16H 7/1218 474/135 |
| 2008/0293527 A1* | 11/2008 | D'Amicantonio | F16H 7/1218 474/135 |
| 2009/0075768 A1* | 3/2009 | D'Silva | F16H 7/1218 474/135 |
| 2009/0124442 A1* | 5/2009 | Hallen | F16H 7/1218 474/135 |
| 2009/0239696 A1* | 9/2009 | D'silva | F16H 7/1218 474/135 |
| 2010/0113201 A1* | 5/2010 | Lannutti | F16H 7/1218 474/135 |
| 2010/0184546 A1* | 7/2010 | Singer | F16H 7/1218 474/135 |
| 2010/0222169 A1* | 9/2010 | Meano | F16H 7/1218 474/135 |
| 2010/0323833 A1* | 12/2010 | Quintus | F16H 7/1218 474/135 |
| 2011/0045929 A1* | 2/2011 | Rolando | F16H 7/1218 474/112 |
| 2011/0152023 A1* | 6/2011 | Quintus | F16H 7/1218 474/135 |
| 2011/0218066 A1* | 9/2011 | Rolando | F16H 7/1245 474/113 |
| 2011/0294615 A1* | 12/2011 | Crist | F16H 7/1218 474/135 |
| 2011/0300976 A1* | 12/2011 | Lannutti | F16H 7/1218 474/135 |
| 2011/0312455 A1* | 12/2011 | Lannutti | F16H 7/1218 474/135 |
| 2012/0316019 A1* | 12/2012 | Ward | F16H 7/1218 474/135 |
| 2013/0079185 A1* | 3/2013 | Schauerte | F16H 7/1281 474/135 |
| 2013/0116073 A1* | 5/2013 | Liebel | F16H 7/10 474/135 |
| 2014/0038758 A1* | 2/2014 | Jindai | F16H 7/1218 474/135 |
| 2014/0274510 A1* | 9/2014 | Dutil | F16H 7/1218 474/135 |
| 2014/0287860 A1* | 9/2014 | Ma | F16H 7/1218 474/135 |

FOREIGN PATENT DOCUMENTS

| | | |
|---|---|---|
| CN | 101688593 A | 3/2010 |
| CN | 102171489 A | 8/2011 |
| WO | 1999963245 A1 | 12/1999 |
| WO | 2002073066 A2 | 9/2002 |
| WO | 2002095262 A2 | 11/2002 |
| WO | 2002095263 A1 | 11/2002 |
| WO | 2004010024 A2 | 1/2004 |
| WO | 2004027288 A1 | 4/2004 |
| WO | 2004027289 A1 | 4/2004 |
| WO | 2005010402 A1 | 2/2005 |
| WO | 2005028918 A2 | 3/2005 |
| WO | 2005114003 A1 | 12/2005 |
| WO | 2006078681 A2 | 7/2006 |
| WO | 2006137086 A1 | 12/2006 |
| WO | 2007001325 A1 | 1/2007 |
| WO | 2007052312 A1 | 5/2007 |
| WO | 2007066363 A1 | 6/2007 |
| WO | 2008027354 A2 | 3/2008 |
| WO | 2008027355 A2 | 3/2008 |
| WO | 2008027369 A2 | 3/2008 |
| WO | 2008068782 A1 | 6/2008 |
| WO | 2008149389 A1 | 12/2008 |
| WO | 2010015469 A1 | 2/2010 |
| WO | 2010018296 A1 | 2/2010 |
| WO | 2010054104 A1 | 5/2010 |
| WO | 2010105883 A1 | 9/2010 |
| WO | 2010130534 A1 | 11/2010 |
| WO | 2010130553 A1 | 11/2010 |
| WO | 2011149661 A1 | 12/2011 |
| WO | 2011162948 A1 | 12/2011 |
| WO | 2012140817 A1 | 10/2012 |
| WO | 2012170262 A1 | 12/2012 |

OTHER PUBLICATIONS

International Search Report and Written Opinion for PCT/CA2014/000429, dated Aug. 1, 2014.

Office Action for CN201480027605.8 dated Jun. 1, 2017.

Office Action for CN201480027605.8 dated Jun. 1, 2017—English translation.

* cited by examiner

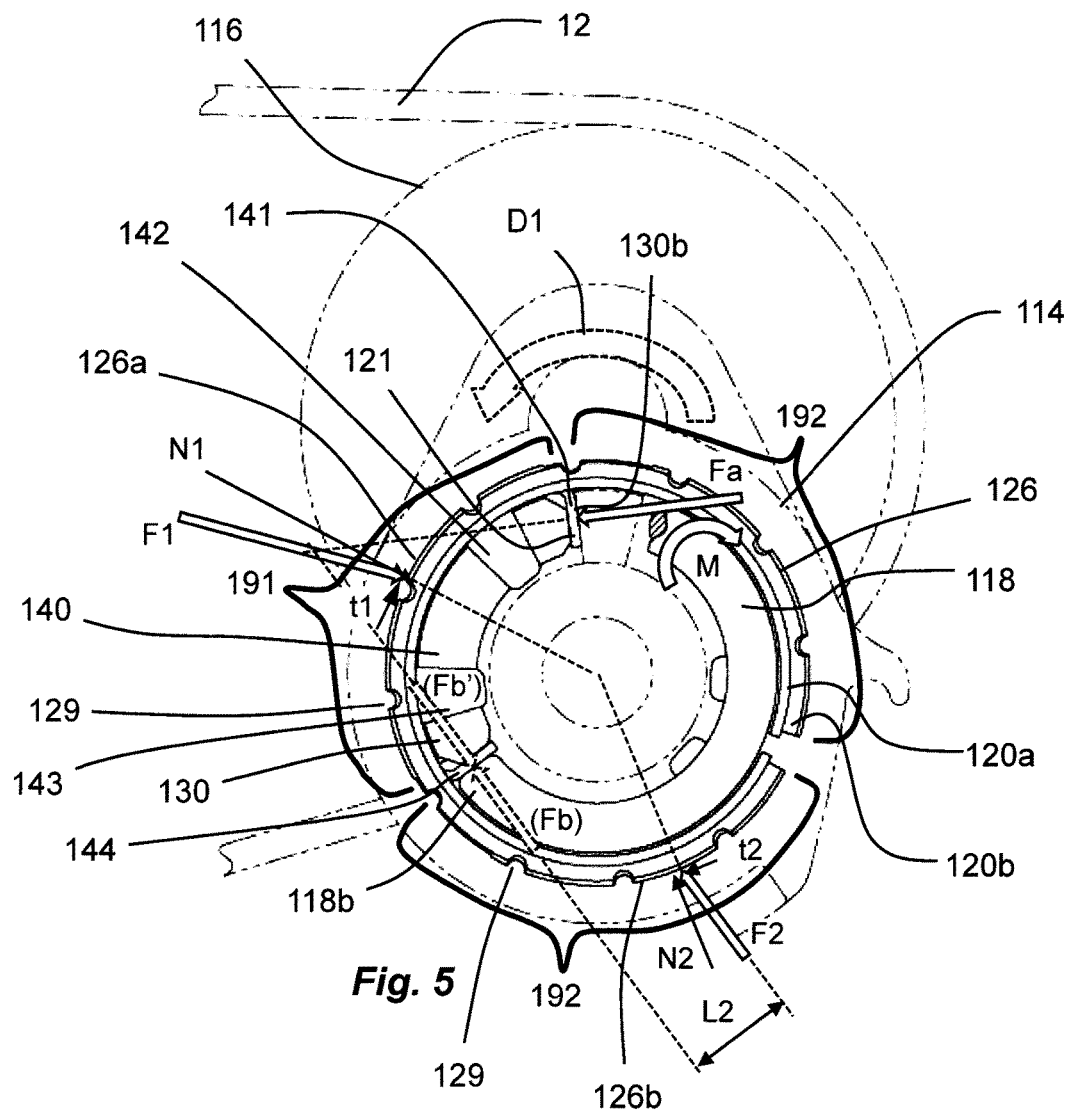
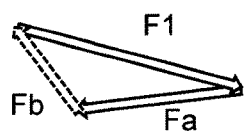
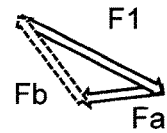
Fig. 5
Fig. 5a
Fig. 5b

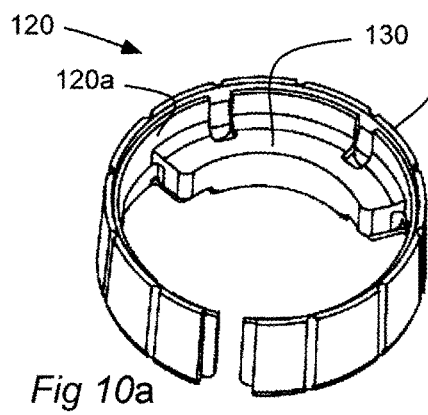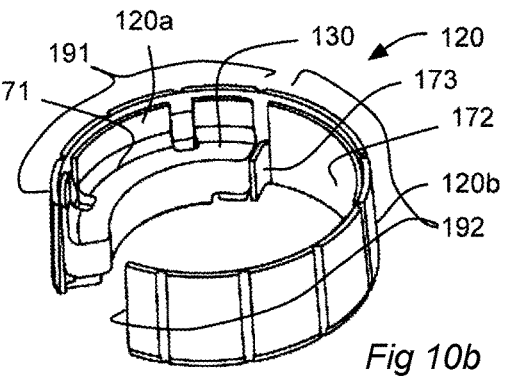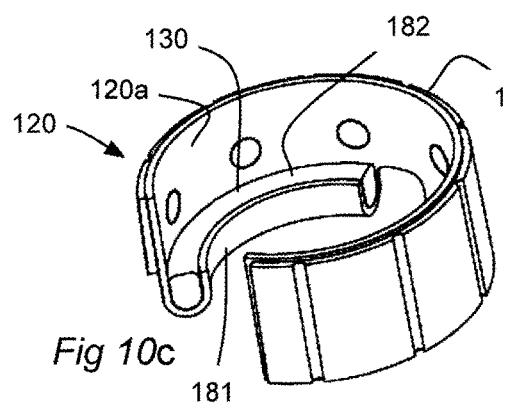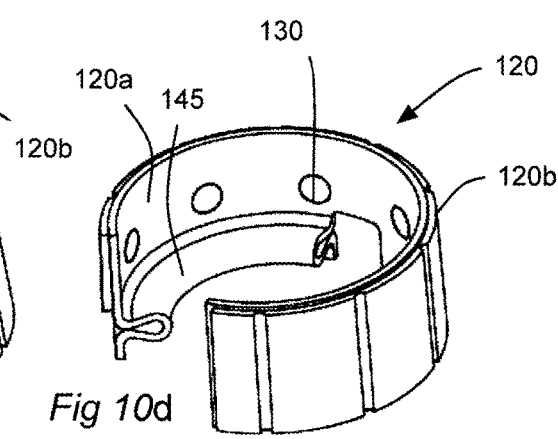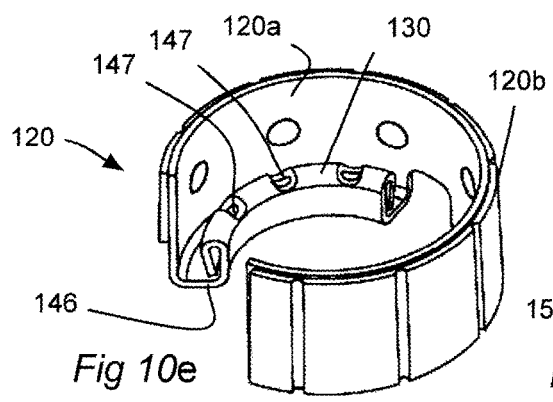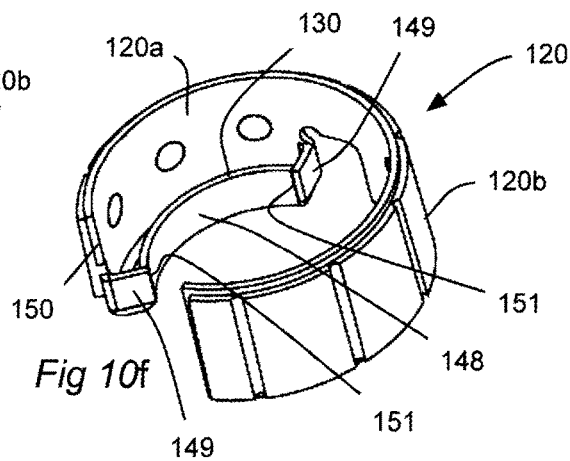

TENSIONER WITH IMPROVED DAMPING

CROSS-REFERENCE TO RELATED APPLICATIONS

This application claims the benefit of U.S. Provisional Patent Application No. 61/822,914, filed May 14, 2013, the contents of which are incorporated by reference as if fully set forth in detail herein.

FIELD

The present disclosure relates to tensioners for endless drive members such as belts, and more particularly for tensioners with damping elements.

BACKGROUND

Tensioners for endless drive members such as belts are well known in the art. It is useful to provide a tensioner with some form of damping, so as to inhibit the development of resonance in the tensioner when it is exposed to vibrations in a belt being tensioned. There is a general need for improved damping, as the amount of damping provided by some tensioners is insufficient to prevent resonance under a wide range of conditions.

Additionally, it has been found that some tensioners suffer premature failure due to uneven wear in a bushing that is present between the stationary and pivoting portions of the tensioner. It would be beneficial to address the issue of uneven wear in the bushing.

SUMMARY

In an aspect, a tensioner for tensioning an endless drive member on an engine, is provided, comprising a base that mounts to the engine, a tensioner arm that is pivotally connected to the base for pivotal movement about a tensioner arm axis, a pulley rotatably mounted to the tensioner arm for rotation about a pulley axis that is spaced from the tensioner arm axis, a tensioner spring and a damping member. The tensioner spring is positioned to urge the tensioner arm into an endless drive member. The spring has a first helical end and a second helical end. The first helical end is positioned to transfer force with a first spring end force transfer surface on the base and the second helical end is positioned to transfer force with a second spring end force transfer surface on the tensioner arm. The damping member is positioned in a surrounding relationship with the tensioner spring. The damping member includes a spring force adjustment member having a first end face and a second end face spaced from the first end face by a selected angular spacing. The damping member includes a first portion that contains the spring force adjustment member and that is generally rigid, and at least one second portion that is adjacent the first member and that is flexibly joined to the first member. The spring force adjustment member is positioned between one of the spring ends and one of the spring end force transfer surfaces on one of the base and the tensioner arm. The damping member is frictionally engaged with the other of the base and the tensioner arm during pivotal movement of the tensioner arm relative to the base.

In an aspect, a tensioner for tensioning an endless drive member on an engine, is provided, comprising a base that mounts to the engine, a tensioner arm that is pivotally connected to the base for pivotal movement about a tensioner arm axis, a pulley rotatably mounted to the tensioner arm for rotation about a pulley axis that is spaced from the tensioner arm axis, a tensioner spring and a damping member. The tensioner spring is positioned to urge the tensioner arm into an endless drive member. The spring has a first helical end and a second helical end. The first helical end is positioned to transfer force with a first spring end force transfer surface on the base and the second helical end is positioned to transfer force with a second spring end force transfer surface on the tensioner arm. The damping member is positioned in a surrounding relationship with the tensioner spring. The damping member includes a spring force adjustment member having a first end face and a second end face spaced from the first end face by a selected angular spacing. The spring force adjustment member is positioned between the second helical spring ends and the second spring end force transfer surface on the tensioner arm. The damping member is frictionally engaged with the base during pivotal movement of the tensioner arm relative to the base. The helical spring includes a plurality of spring coils, and wherein one of the spring coils proximate the second helical end of the spring engages a spring engagement lip segment on the tensioner arm, such that, in use, an end force is applied between the second end of the spring and the first end face of the spring force adjustment member and a side force is applied between the spring engagement lip segment and a radially outer side face of the spring coil and is generally opposed to the end force. The tensioner arm is pivotally connected to the stationary member via a bushing. A reaction force from the bushing on the tensioner arm to support the tensioner arm is approximately centered axially on the bushing. In some embodiments, the portion of the damping member that includes the spring force adjustment member need not be rigid.

BRIEF DESCRIPTION OF THE DRAWINGS

The present disclosure will now be described, by way of example only, with reference to the attached drawings, in which:

FIGS. 3a and 3b are plan and side views of a tensioner in accordance with an embodiment of the present invention, wherein FIG. 3b is a sectional view along section line 3b-3b in FIG. 3a;

FIG. 5 is a plan view of a portion of the tensioner shown in FIGS. 3a and 3b, illustrating some forces that act on selected elements of the tensioner;

FIGS. 5a and 5b are illustrations of forces shown in FIG. 5 under certain circumstances;

FIGS. 6a and 6b are plan and side views of a tensioner in accordance with another embodiment of the present invention, wherein FIG. 6b is a sectional view along section line 6b-6b in FIG. 6a;

FIGS. 10a-10f show alternative constructions for a damping member that is part of the tensioner shown in FIGS. 3a and 3b;

DETAILED DESCRIPTION

Figure 1:
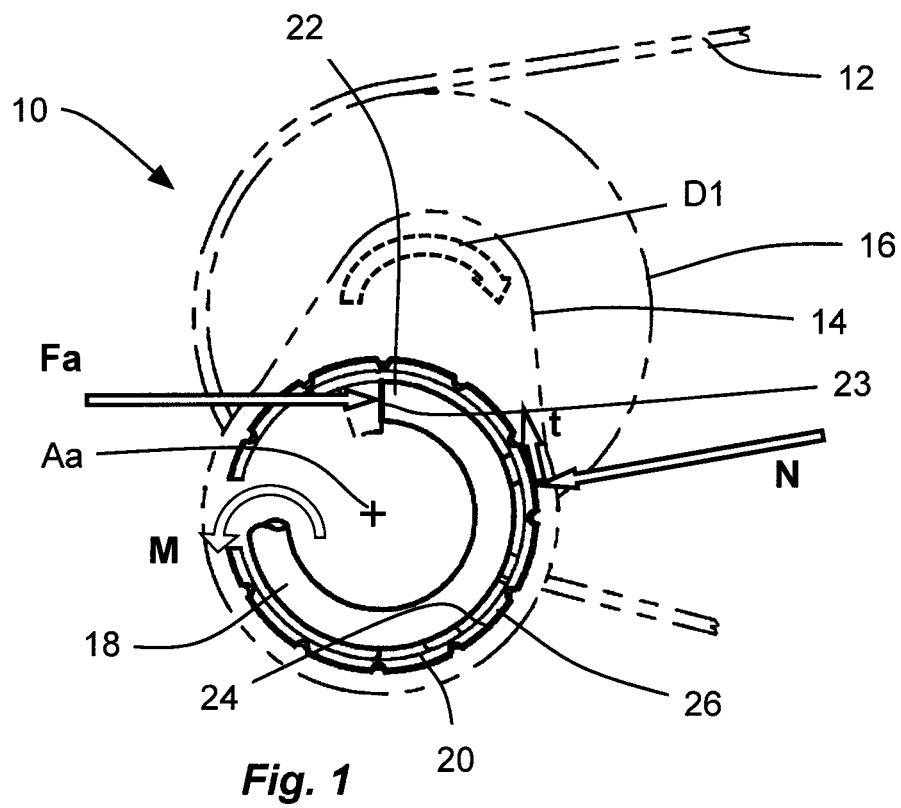
FIGS. 1 and 2 are plan and side views of a tensioner in accordance with the prior art.
Figure 2:
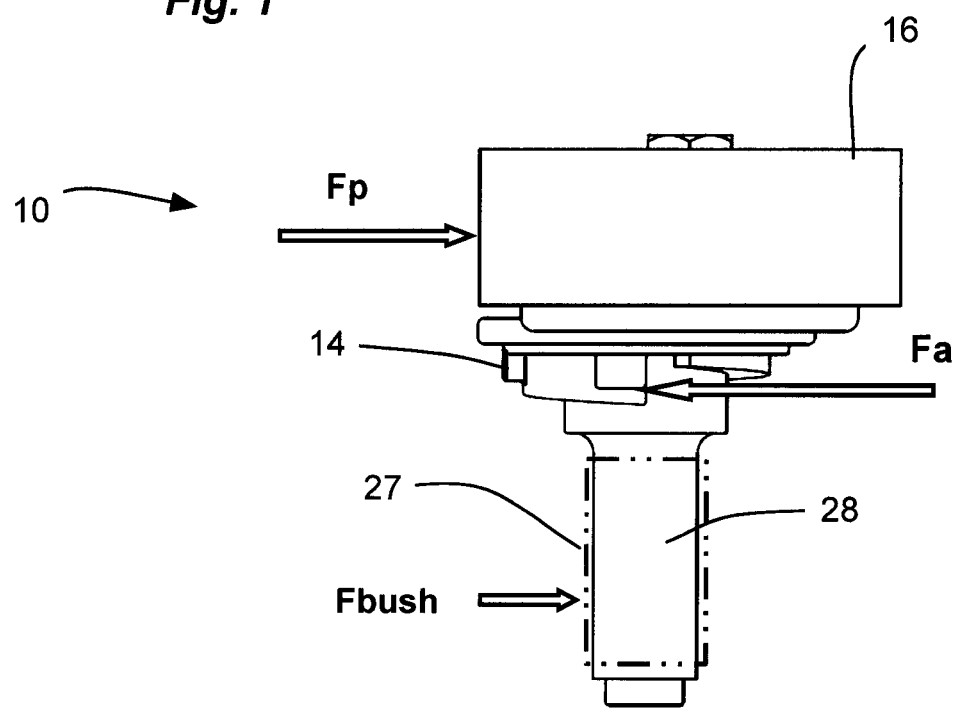
Figure 3A:
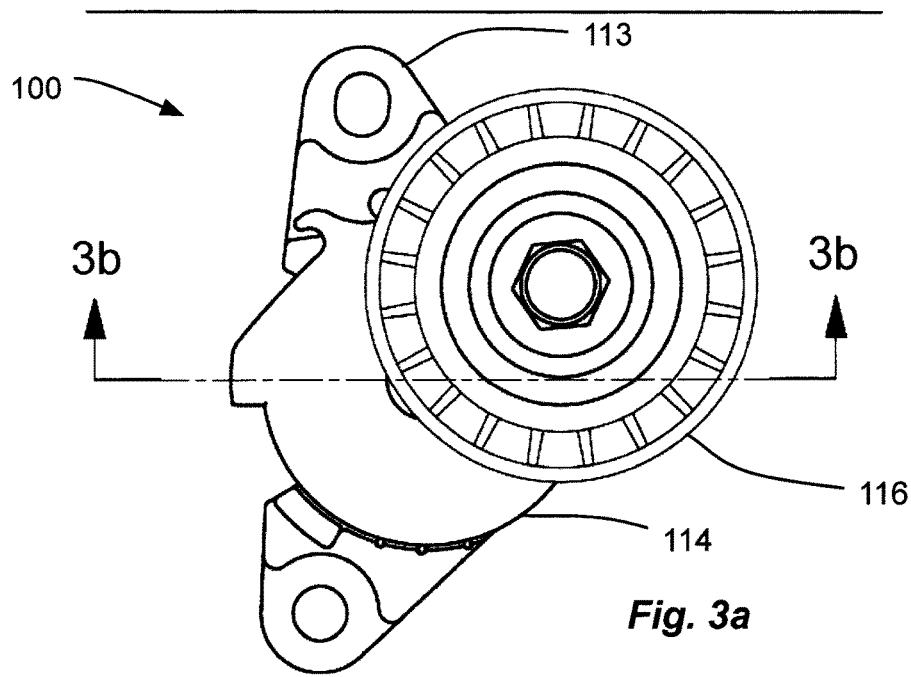
Figure 3B:
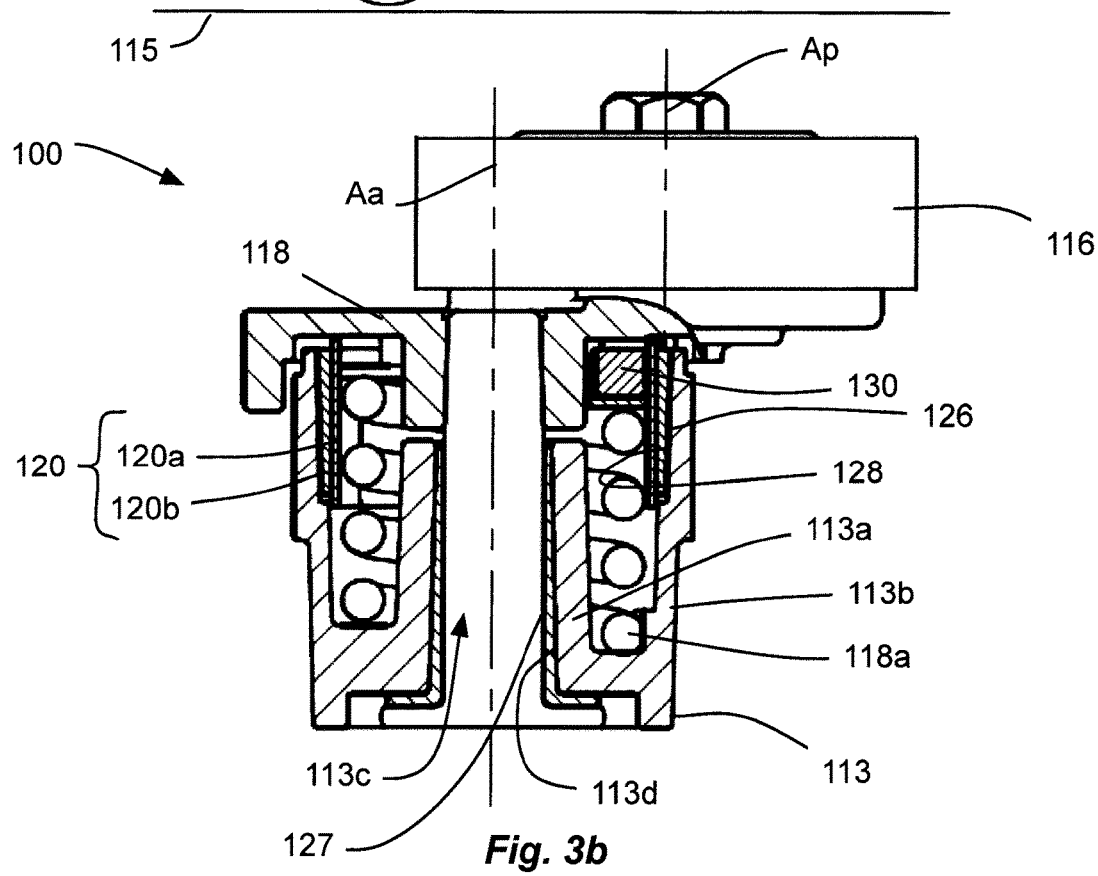

Reference is made to FIGS. 1 and 2, which show selected elements from a tensioner 10 that is used to maintain tension in a belt 12 that is driven by an engine crankshaft (not shown) on an internal combustion engine (not shown), in accordance with the prior art. The tensioner 10 includes a base (not shown), which mounts to the engine typically, a tensioner arm 14 that is pivotable relative to the base about an arm pivot axis Aa, a pulley 16 that is rotatable on the tensioner arm 14 about a pulley axis Ap, a tensioner spring 18 that urges the tensioner arm 14 in a selected direction, which in the view shown in FIG. 1 is counterclockwise, and a damping member 20. In FIG. 1, only a portion of the tensioner spring is shown. The tensioner spring 18 may be, for example, a helical torsion spring, having a first end (not shown) that engages a first end engagement surface on the base, and a second end 22 that engages a second end engagement surface 23 on the arm 14. The belt 12 applies a hub load to the pulley 16 which urges the arm 14 in a first direction which is a direction of increasing stored potential energy of the spring 18 (clockwise in the view shown in FIG. 1). The first direction is shown by arrow D1. The spring 18 counteracts the hub load applied by the belt 12 and urges the tensioner arm 14 in a second direction that is opposite the first direction, and which is a direction of decreasing stored potential energy of the spring 18. The first direction may also be referred to as a spring windup direction, and the second direction may also be referred to as a spring release direction or spring return direction. The damping member 20 applies a frictional force to the movement of the tensioner arm 14 that resists the movement of the tensioner arm 14 so as to inhibit vibrations at the belt 12 from causing resonance in the tensioner arm 12.

FIG. 1 shows a free body diagram of a portion of the tensioner spring 18 that includes the second end 22, and the damping member 20. As can be seen in FIG. 1, there is a force Fa acting on the end 22 of the spring 18. This is the force of the arm 14 being pulled in the first direction by the belt 12. The force Fa may be referred to as the arm force. As a result of the force Fa, the spring 18 opens radially and drives the damping member 20 into the inner surface 24 of a sleeve portion of the base. A reaction force is applied to the outer surface (shown at 26) of the damping member 20 by the sleeve portion of the base. The reaction force is shown at N and is normal to the outer surface 26 of the damping member 20. The normal force N is at a small angle relative to the force Fa. Due to the engagement of the damping member and the sleeve portion of the base at the point where force N is applied, there is a resulting friction force shown at t applied by the inner surface 24 and the damping member 20. As is well known the friction force between the base and the damping member 20 depends directly on the normal force N applied between them. The friction force t, the normal force N and the arm force Fa all sum to zero when the arm 14 and spring portion shown are together in equilibrium. A moment M applied to the tensioner spring portion counteracts the net moment resulting from the forces Fa and N, wherein the net moment results from the distance between the two forces Fa and N (the distance being shown at L2).

FIG. 2 shows a free body diagram of the tensioner arm 14 and the pulley 16. The hub load is shown at Fh. The force of the end 22 on the second end engagement surface 23 is Fa. A bushing load Fbush is applied between a bushing 27 that is present between a shaft portion 28 of the tensioner arm 14 and an inner sleeve portion (not shown) of the base. The bushing 27 is shown in stippled lines to represent it in a transparent form so as not to obscure the shaft portion 28. As can be seen, the bushing load Fbush acts on a relatively low region on the bushing 27 in order to generate an equilibrium with the forces Fp and Fa. This can cause localized wear on the bushing 27, which can ultimately lead to a wobble in the movement of the tensioner arm 14. This can eventually lead to failure of the tensioner 10.

In some applications it would be beneficial to provide a tensioner that was capable of a relatively higher amount of damping (i.e. a greater frictional force) resisting movement of the tensioner arm 14. It would also be desirable to provide a tensioner that provided more even wear on the bushing 27.

Figure 11A:
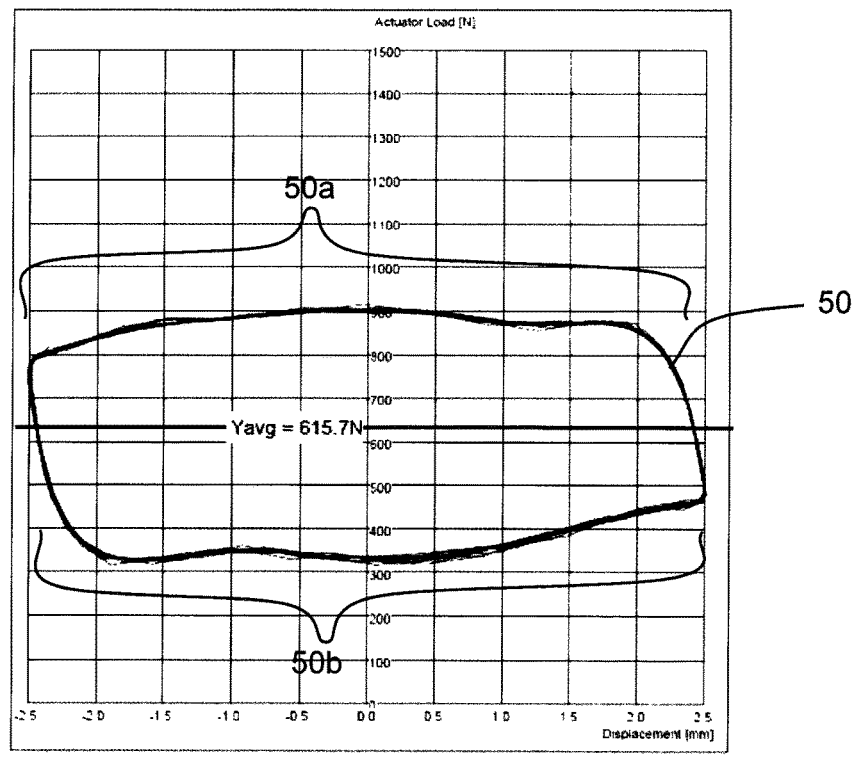
FIG. 11a is a graph illustrating the torque generated by the tensioner shown in FIGS. 1 and 2.

The graph shown in FIG. 11a provides a curve 50 that is representative of the torque generated in the tensioner arm 14 at a given angular position of the arm 14. The upper portion (shown at 50a) of the curve 50 shows the torque generated when the arm 14 is moving in the first, or spring windup direction. The lower portion (shown at 50b) of the curve 50 shows the torque generated when the arm 14 is moving in the second, or spring release direction.

Reference is made to FIGS. 3a, 3b, 4 and 5, which show a tensioner 100 in accordance with an embodiment of the present invention. The tensioner 100 has increased damping relative to the tensioner 10. The tensioner 100 includes a base 113, a tensioner arm 114, a pulley 116, a tensioner spring 118, a damping member 120 and a bushing 127. The base 113 has an inner sleeve 113a and an outer sleeve 113b. The base 113 further includes mounting features 117 (e.g. apertures) for mounting the base 113 to a stationary member, such as an engine block (shown at 115 in FIG. 3a), in a well-known manner (e.g. via threaded fasteners that pass through the apertures into corresponding apertures in the engine block).

The tensioner arm 114 includes a shaft 114a that pivots within a central aperture 113c of the base 113 about a tensioner arm pivot axis Aa. The bushing 127 provides a selected amount of slidability between the shaft 114a and the central aperture wall shown at 113d of the base 113. In other words, the bushing provides a selected (preferably low) amount of friction between the shaft 114a and the central aperture wall 113d.

The pulley 116 is rotatable on the tensioner arm 114 about a pulley axis Ap that is spaced from the axis Aa. The pulley 116 engages the belt 12. The pulley 116 may instead be any other suitable endless drive member engagement member for engaging any other suitable endless drive member instead of a belt.

The pulley 116 is mounted to the tensioner arm 114 via a pulley fastener 123 (e.g. a shoulder bolt). A dust shield 125 covers the pulley 116 and is also held in place by the fastener. For simplicity, the pulley 116 is not shown in section view in FIG. 3b, although the other components of the tensioner 100 are.

The tensioner spring 118 acts between the base 113 and the arm 114 and biases the tensioner arm 118 in a spring release direction (which is in a direction into the belt 12) so as to counteract the load applied by the belt 12 on the pulley 116. The spring 118 has a first end 118a (FIG. 4) and a second end 118b (FIG. 5) and may be a helical torsion spring, having a plurality of coils 118c between the first and second ends 118a and 118b. The tensioner spring 118 has a radially outer surface 118d. The first end 118a engages the base 113 via a first spring end force transfer surface 119 positioned to transfer force to and to and from the spring 118. In this example, the engagement between the first end 118a and the force transfer surface 119 is direct. The second spring end 118b engages the arm 114 via a second spring end force transfer surface 121. This engagement is indirect, as is described below.

The damping member 120 may be any suitable type of damping member. For example, in the embodiment shown the damping member 120 includes a structural support member 120a, and a friction member 120b that is radially outside of the structural member 120a and that is fixedly mounted to the structural support member 120a, (e.g. by overmolding). The connection between the structural support member 120a and the friction member 120b may be as described in any of the embodiments disclosed in PCT publication WO2013/059929, which was filed Oct. 26, 2012, the contents of which are incorporated herein in their entirety. The structural member 120a provides strength and supports the friction member 120b. The friction member 120b provides a selected friction coefficient during sliding contact with the outer sleeve portion 113b. The structural support member 120a may be, for example, metallic (e.g. a suitable steel). The friction member 120b may be polymeric, (e.g. an unfilled nylon). Debris channels 129 may be provided in the friction member 120b to assist in clearing debris that may migrate between the friction member 120b and the surrounding sleeve portion 113b of the base 113.

It will be appreciated that the damping member 120 is constructed to permit radial expansion so that portions of (or all of) the damping member 120 can be brought into engagement with the surrounding outer sleeve portion 113b of the base 113 to generate friction therewith. In the construction shown, the radial expansion is permitted by forming the damping member 120 to be C-shaped, (i.e. to have a shape that does not extend through a full 360 degrees angularly). For example, the damping member 120 may extend through 320 degrees approximately, or through some other suitable angular range.

As part of the damping member 120, there is a spring force adjustment member 130. The spring force adjustment member 130 has a first end face 130a that is abutted by the second end 118b of the spring 118, and a second end face 130b that itself abuts the second spring end force transfer surface 121. During operation, force is transferred between the second end 118b of the spring 118 and the tensioner arm 114 via the spring force adjustment member 130. As a result of being pinned between the second end 118b of the spring 118 and the force transfer surface 121 on the arm 114, the spring force adjustment member 130 and the damping member 120 in general, move angularly with the tensioner arm 114 and with the second end 118b of the spring 118. The outer surface of the damping member 120 is shown at 126 in FIG. 3b and is engageable with the inner surface shown at 128 of the outer sleeve 113b of the base 113. Because the base 113 is stationary, when there is relative movement of the arm 114 on the base (due to a change up or down in the belt tension), there is correspondingly relative movement between the damping member 120 and the base 113. This relative movement provides sliding and therefore friction between the arm 114 and the base 113, which dampens the movement of the arm 114.

The damping member 120 may be divided circumferentially into two portions, namely a first circumferential damping member portion 191 and two second circumferential damping member portion 192. The first circumferential damping member portion 191 contains the spring force adjustment member 130 and may be relatively rigid. The second circumferential damping member portions 192 may be flexibly joined to the first portion 191. In the embodiment shown, the second portions 192 are themselves flexible (i.e. non-rigid) along their circumferential length. Also, in the embodiment shown, there are two second portions 192, one on either side of the first portion 191. It is alternatively possible to provide a damping member 120 where there is only one second portion 192 (e.g. as shown in FIG. 10b). It is alternatively possible to provide an embodiment having a rigid first portion 191 (having the spring force adjustment member) and having at least one second portion 192 that is flexibly joined to the first portion 191 (e.g. by means of a living hinge between the two portions), but which is itself rigid.

As best seen in FIG. 5, the presence of the spring force adjustment member 130 changes the position of the second end 118b of the spring 118 from a position where the spring end 118b is directly engaged with the surface 121 on the arm 114 to a position where at least a component of the force of the spring end 118b into the damping member 130 (via surface 130a) is in the same direction as the force exerted by the tensioner arm 114 into the damping member 130 (via surface 130b). It will be noted that the forces transferred into the damping member 130 via surfaces 130a and 130b (shown at Fb and Fa respectively) are transferred in a direction that is normal to the surfaces 130a and 130b. Thus, because the surface 130a and the surface 130b at least partially face in the same direction, the forces exerted thereon by the spring end 118b and the force transfer surface 121 are at least partially additive. In the embodiment shown, the surfaces 130a and 130b have a selected angular spacing of approximately 120 degrees, however, they may have other angular spacings. For example, a spacing of about 180 degrees may be advantageous because the surfaces 130a and 130b would be parallel, and as a result, the forces Fa and Fb would be purely additive since they would be oriented in the same direction. As a result, the normal force N1 would be large as it would counteract the sum of the two forces Fa and Fb. A spacing of between about 90 and 180 degrees is still advantageous, however. A spacing of less than about 90 degrees (but greater than 0) is still advantageous but may be less so than a spacing in the range of about 90 to about 180 degrees. A spacing of greater than about 180, but less than 270 degrees is still advantageous, but may be less so than a spacing of about 90 to about 180 degrees. This depends in part on the overall swept angle of the damping member 120 and whether there would be sufficient room for the spring 118 to engage the available portion of the damping member 120 to fully realize the friction force t2.

FIG. 5 is a free body diagram. Initially it is described in relation to the forces acting on the damping member 120. Afterwards it is described in relation to the forces acting on an end portion of the spring 118 (i.e. the end portion that includes the second end 118b).

Due to tension in the belt 12, a force Fa is exerted from the tensioner arm 114 on the surface 130b of the spring force adjustment member 130 (which is part of the damping member 120). The spring end 118b exerts a force Fb on the surface 130a of the damping member 120. These forces drive a portion (shown at 126a) of the outer surface 126 (FIG. 3b) of the damping member 120 into engagement with the inner surface (shown at 128) of the outer sleeve portion 113b of the base 113. As a reaction, the outer sleeve portion 113b exerts a force N1 on the damping member 120.

Additionally, due to the sliding contact between the damping member 120 and the base 113, a frictional force (i.e. a damping force) is exerted between the damping member 120 and the base 113. This frictional force is shown at t1 and is dependent on the magnitude of the normal force N1 (and on the coefficient of friction between the damping member 120 and the base 113). The forces N1 and t1 are orthogonal and may be referred to together as a force F1 (the force F1 being the vector sum of the two forces N1 and t1).

Because the forces Fb and Fa are at least somewhat additive, the normal force N1 is relatively larger than it would be in the prior art tensioner shown in FIG. 1. Thus, the frictional force (i.e. the damping force) t1 that is generated is larger than the force that would be generated in the tensioner shown in FIG. 1. FIG. 5a shows the forces Fa, Fb and F1. It will be noted that, in equilibrium, the vector sum of these forces acting on the damping member 120, will add to zero. This is shown graphically in FIG. 5a.

Viewed from another perspective, if one uses the force transfer surface 121 as a pivot point for the first portion 191 of the damping member 120, one can see that the force Fb generates a certain moment on the first portion 191, which is counteracted by the normal force N1. Given that the moment arm of the force Fb is larger than the moment arm of the normal force N1 (with respect to the pivot point which is the force transfer surface 121), in order for there to be equilibrium the magnitude of the normal force N1 must be proportionally larger than the magnitude of the force Fb. Thus, the normal force N1 is 'amplified' as compared to the force Fb. As a result of the large normal force N1, the friction force generated at the interface between the damping member 120 and the base 113 is relatively large. The concept of describing equilibrium between the moments provided by the spring end force Fb and the normal force N1, is predicated somewhat on the rigid nature of the first circumferential portion 191, however. By comparison, for example, actuation of a force on a band member that has a friction surface on it (e.g. a band brake) presses substantially the entire length of the band on the surface against which it is intended to generate friction.

Additionally, it will be noted that there is a reaction force that is equal and opposite to the force Fb exerted by the damping member 120 onto the second end 118b of the spring 118. This force is shown as Fb' in FIG. 5. This drives the spring 118 into another portion of the damping member 120 thereby driving another portion (shown at 126b) of the outer surface 126 of the damping member 120 into engagement with another portion of the inner surface 128 (FIG. 3b) of the outer sleeve portion 113b of the base 113. As a result, another reaction force is exerted on the damping member 120 by the outer sleeve 113b of the base 113. The reaction force is shown at N2 and is normal to the damping member 120. This force also results in a friction force (i.e. a damping force) being exerted on the damping member by the base 113, shown at t2. The friction force t2 is dependent on the normal force N2 and on the coefficient of friction between the damping member 120 and the base 113. The forces N2 and t2 are orthogonal and may be referred to together as a force F2 (the force F2 being the vector sum of the two forces N2 and t2). A moment M is present in the spring 118 which counteracts the net moment resulting from the forces Fb' and F2.

FIG. 5 represents the forces acting on the damping member 120 when the tensioner arm 114 is being moved in a selected direction (i.e. counterclockwise, which is in the first, or spring windup direction). The first direction of the tensioner arm 114 is shown by arrow D1. The spring release, or second direction is opposite to the first direction (i.e. it would be clockwise). Movement of the tensioner arm 114 in the first direction D1 takes place when the tension in the belt 12 increases. During this movement of the arm 114, the friction forces act in the directions shown in FIG. 5. However, when the belt tension decreases, the arm 114 will rotate in the spring release, or second direction, which causes a number of forces to change and for the friction forces t1 and t2 to change direction entirely. FIG. 5b represents the forces F1, Fa and Fb when the arm 114 is moving in the second direction.

Figure 11B:
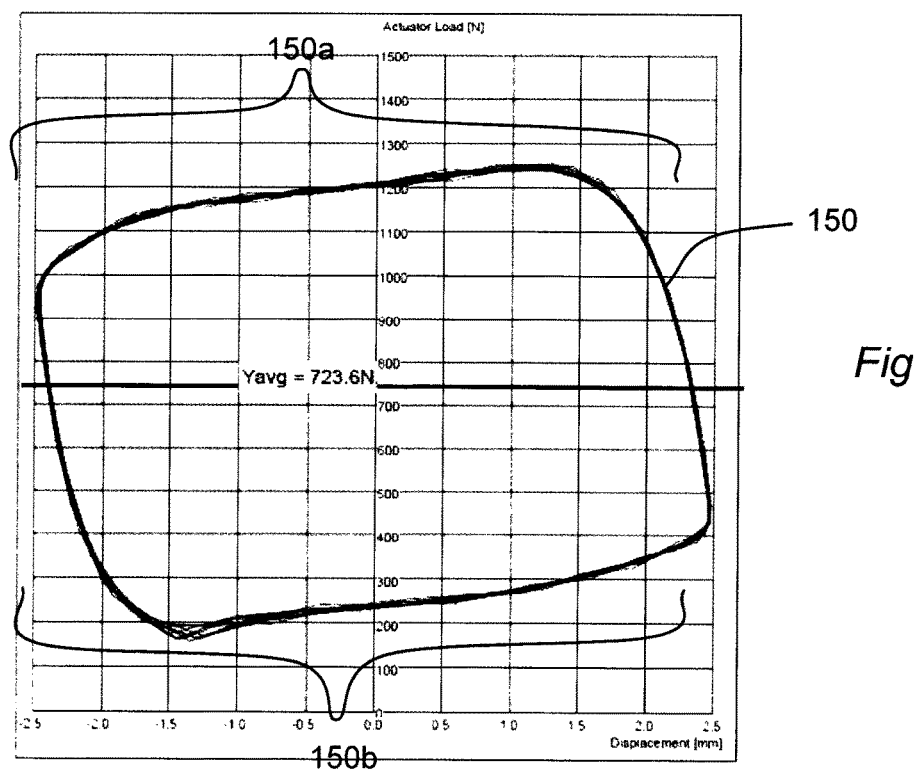
FIG. 11b is a graph illustrating the torque generated by the tensioner shown in FIGS. 3a and 3b.

FIG. 11b shows a curve 150 that represents the torque generated on the arm 114 for a given angular position of the arm 114. As can be seen, curve portion 150a shows that the torque generated is higher relative to portion 50a in FIG. 11a during movement of the arm in the first direction. Also, curve portion 150b shows that the torque generated is lower relative to portion 50b in FIG. 11a during movement of the arm in the spring release direction. The larger difference between the upper and lower curve portions 150a and 150b is generally advantageous over the smaller difference between curve portions 50a and 50b, and indicates a relatively high damping of movement of the arm 114 in the first direction, and relatively less resistance to movement of the arm 114 in the spring release direction, which assists in keeping the pulley 116 in contact with the belt 12 during operation of the engine.

Figure 4:
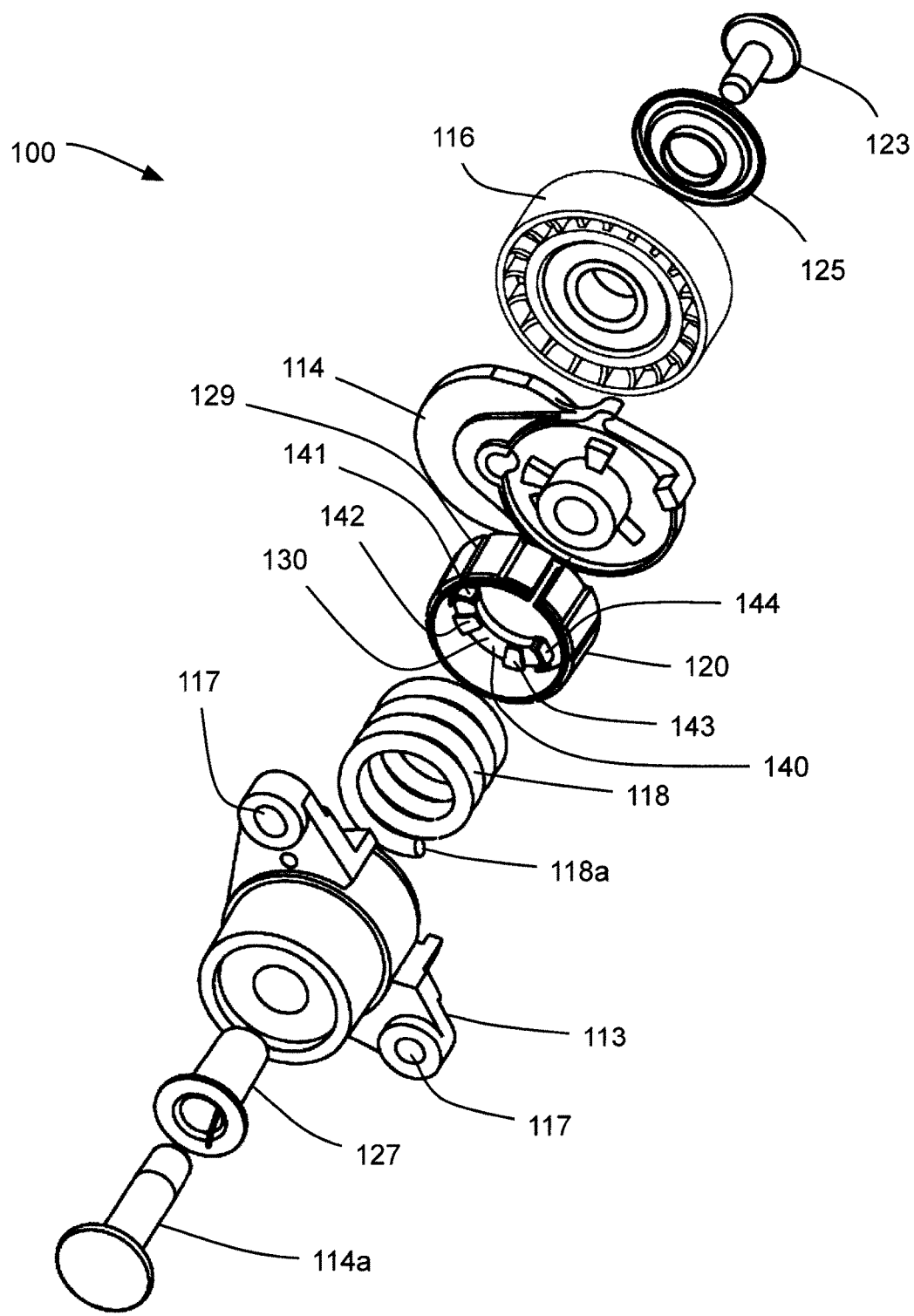
FIG. 4 is a perspective exploded view of the tensioner shown in FIGS. 3a and 3b.
Figure 6A:
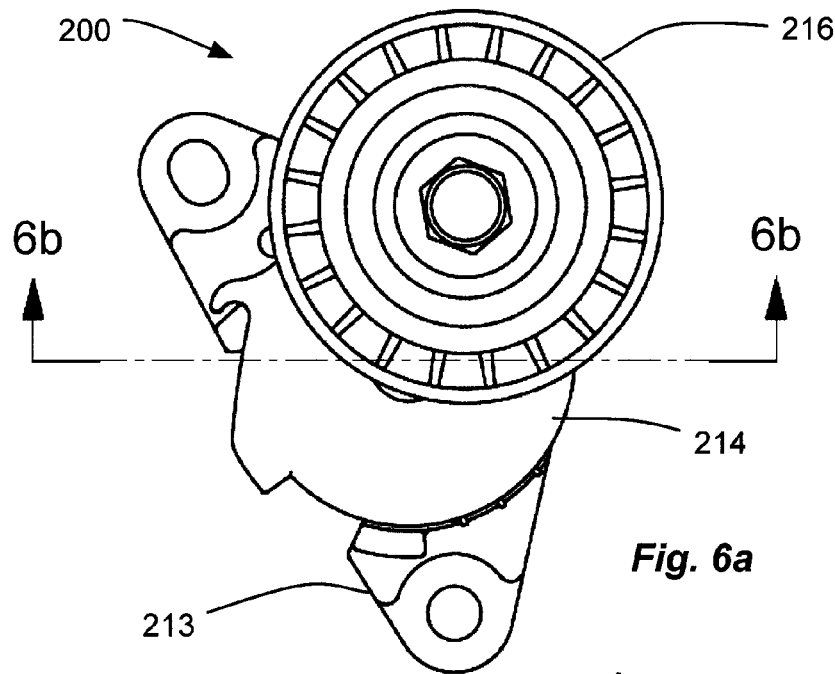
Figure 6B:
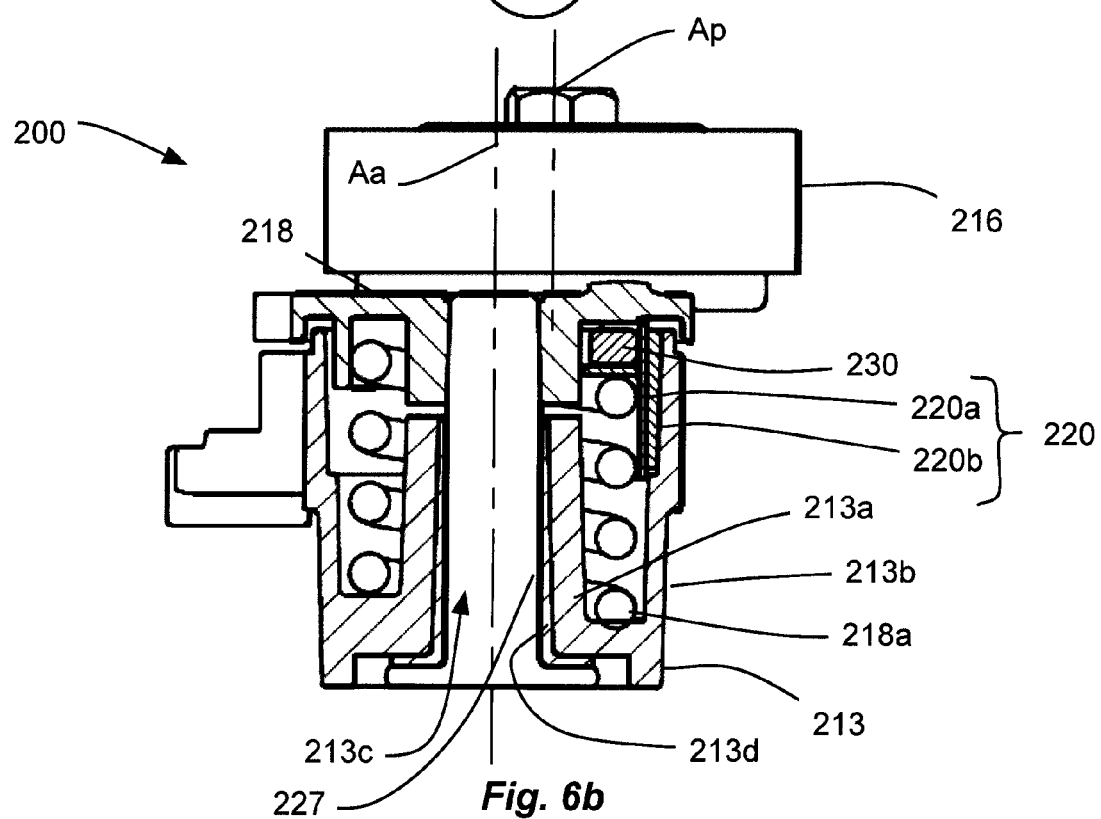

The spring force adjustment member 130 may be incorporated into the damping member 120 in any suitable way. For example, as shown in FIGS. 4 and 5, the spring force adjustment member 130 may be provided by molding a radially inward protrusion 140 in the optionally polymeric friction member 120b, and by punching and folding tabs 141, 142, 143 and 144 of the optionally metallic structural support member 120a to hold the protrusion 140 and to distribute load and prevent gouging or other mechanical damage to the protrusion 140 by the end 118b of the spring 118 and by the force transfer surface 121 on the arm 114.

Alternative constructions for the spring force adjustment member 130 are shown in FIGS. 10a-10f. As shown in FIG. 10a, the spring force adjustment member 130 may be formed (e.g. by casting, machining or any other suitable forming method) directly as part of the structural support member 120. In the embodiment shown in FIG. 10b, the structural support member 120a is itself made up of two pieces, namely a first support piece 171 that includes the spring force adjustment member 130 and which may be made from a forming process such as casting or machining, and an adjacent second support piece 172 that is made from sheet metal. A tab 173 on the second support piece 172 could be punched and bent radially inwardly to sit at the end of the spring force adjustment member 130 and to effectively act as the surface 130a or 130b of the spring force adjustment member 130. In the embodiment shown in Figure In the embodiment shown in FIG. 10c, the structural support member 120a may be made from sheet metal, and may have a lip 181 formed into a generally semi-cylindrical channel. A suitable element 182 (e.g. a segment of metallic material) may be inserted into the channel to fill it and prevent collapse of the sheet metal. As shown in FIG. 10d, a lip 145 on a sheet metal structural support member 120a may be pinched to directly form the spring force adjustment member 130 without the need for a separately inserted member. As shown in FIG. 10e, a lip (shown at 146) on the sheet metal structural support member 120a may be formed with a plurality of apertures 147 that extend in a circumferential row. These apertures 147 provide room for the material of the lip 146 to bend and move as needed to accommodate folding over of the lip 146 to form the spring force adjustment member 130 without the need for an additional component such as the segment 142, thereby precluding the need for an inserted member. As shown in FIG. 10f, the lip shown at 148 may be turned up to form a channel. Tabs 149 may be punched out of the main circumferential portion shown at 150 and may be bent radially inwardly to overlap edges 151 of the lip.

While it has been shown for the damping member 120 to be positioned to be pinned between the second spring end 118b and the force transfer surface 121 on the arm 114 and for it to move with the tensioner arm 114 and frictionally engage the base 113, it is alternatively possible to provide an embodiment wherein the damping member 120 is pinned between the first spring end 118a and the force transfer surface 119 on the base 113, and for it to frictionally engage a wall of the tensioner arm 114. In such an embodiment, the base 113 may have a relatively short outer sleeve 113b, while the tensioner arm 114 may have a relatively long sleeve positioned to engage the damping member 120.

Reference is made to FIGS. 6a-9b which show a tensioner 200 in accordance with another embodiment of the present invention. The tensioner 200 may be similar to the tensioner 100, and similar parts will be identified with similar references numerals but beginning with a 2 instead of a 1. Therefore, element 214 will be similar to element 114, element 216 will be similar to element 116 and so on. Differences between the similar parts are described below.

Tensioner 200 includes a base 213 that includes an inner sleeve 213a and an outer sleeve 213b and that is mountable to an engine (not shown), a tensioner arm 214 that pivots about an arm axis Aa, a pulley 216 that is rotatable on the tensioner arm 214 about a pulley axis Ap, a tensioner sprint 218, and a damping member 220 that includes a structural support member 220a and a friction member 220b.

The tensioner arm 214 includes a shaft 214a that extends through a central aperture 213c of the base 213. A bushing 227 provides a selected amount of slidability between the shaft 214a and the central aperture wall shown at 213d of the base 113. In other words, the bushing 227 provides a selected (preferably low) amount of friction between the shaft 114a and the central aperture wall 213d.

The pulley 216 is mounted to the tensioner arm 224 via a pulley fastener 223 (e.g. a shoulder bolt), which also holds a dust shield 225 in place to cover the pulley 216.

The tensioner spring 218 has a first end 218a (FIG. 7) that engages the base 113 via a first spring end force transfer surface 219, and a second end 218b (FIG. 5) that indirectly engages the arm 214 via a second spring end force transfer surface 221, and via a spring force adjustment member 230, in similar manner to the engagement between spring end 118b and force transfer surface 121 via spring force adjustment member 130. The spring force adjustment member 230 is part of the damping member 220 and may structurally be similar to the spring force adjustment member 130. The spring force adjustment member 230 has a first end face 230a that is abutted by the second end 218b of the spring 218, and a second end face 230b that itself abuts the second spring end force transfer surface 221.

Figure 7:
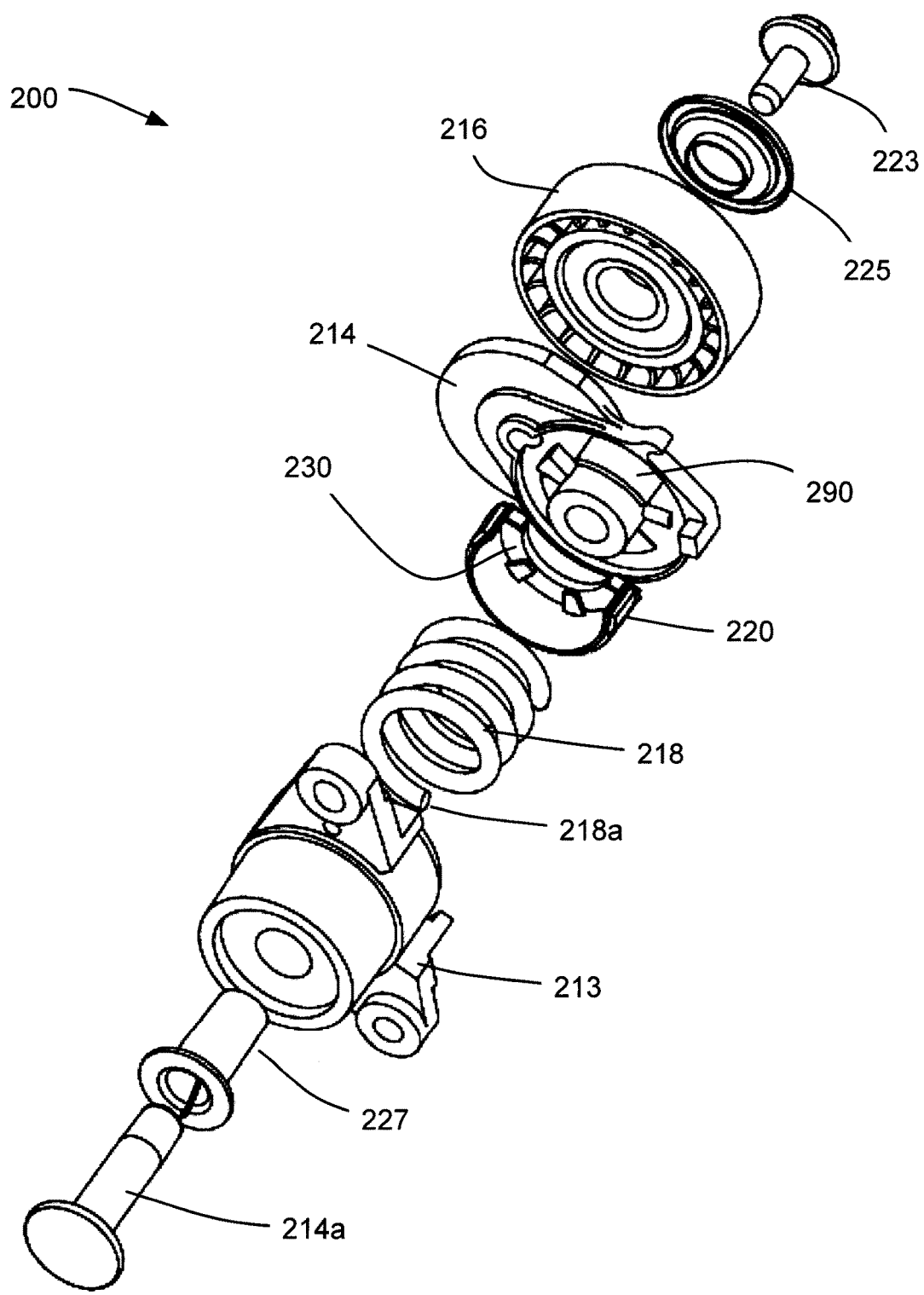
FIG. 7 is a perspective exploded view of the tensioner shown in FIGS. 6a and 6b.
Figure 8:
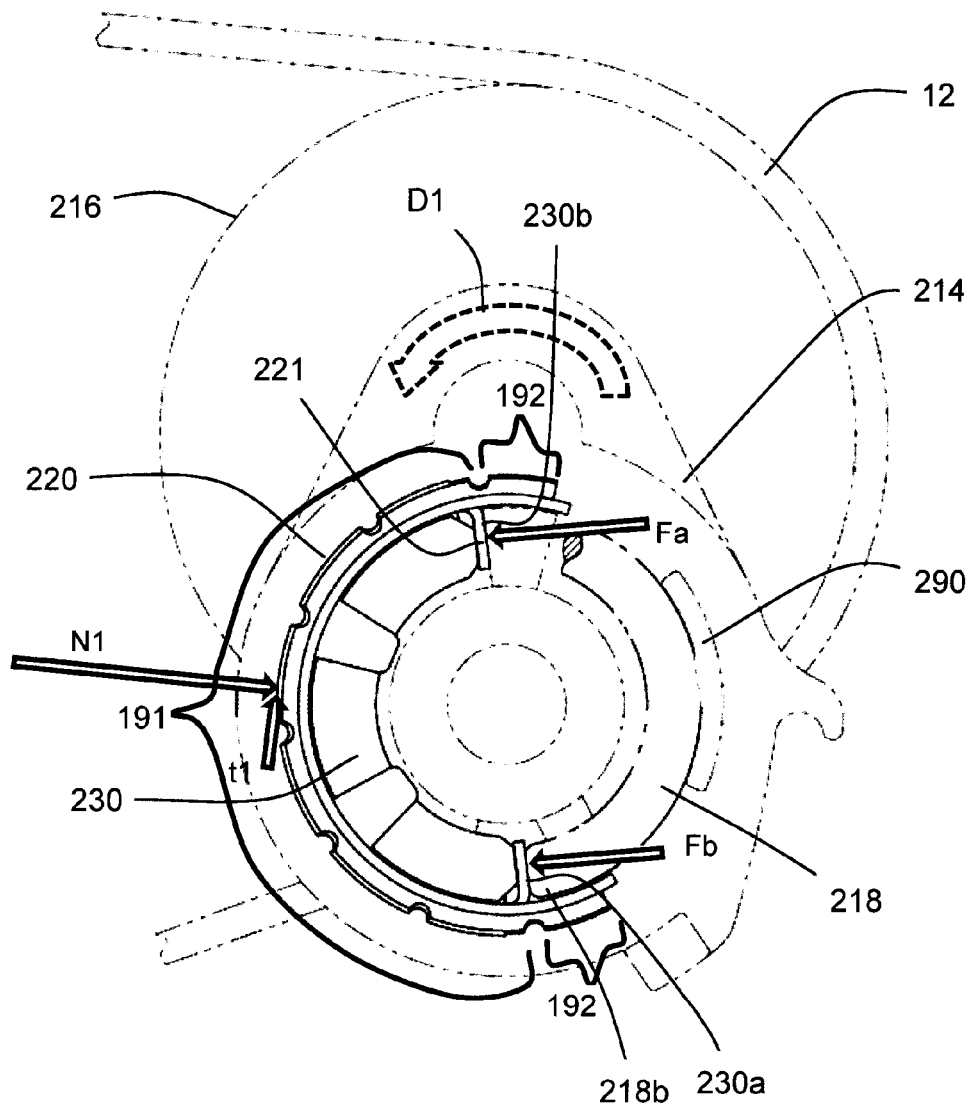
FIGS. 8 and 8a are plan views of a portion of the tensioner shown in FIGS. 6a and 6b, illustrating some forces that act on selected elements of the tensioner.

As can be seen in FIGS. 7 and 8 in particular, the damping member 220 covers a smaller angular range than the damping member 120 (FIG. 5). As a result, as shown in the free body diagram of the damping member 220 shown in FIG. 8, the damping member 220 is positioned and sized to engage inner sleeve of the base 213 and to receive the reaction force N1 (and friction force t1) therefrom, but the damping member 220 is not engaged by the end portion of the spring 218 to cause the reaction force N2 and t2 as is the case in FIG. 5 with damping member 120. As can be seen in FIG. 8, the force N1, which is normal to the damping member 220, and the force t1 which is the friction force acting on the damping member 220 from the engagement with the base 213 (FIG. 6b), counteract the forces Fa and Fb, where the force Fa is the arm force from the tensioner arm 214 on the end face 230b of the spring force adjustment member 230, and the force Fb is the spring end force from the end 218b of the spring 218 acting on the end face 230a. In similar fashion to the spring force adjustment member 130, the repositioning of the end 218b of the spring 218 caused by the presence of the spring force adjustment member 230 causes the forces Fa and Fb to be at least somewhat additive vectorially, which in turn results in an increase in the magnitude of the normal force N1 relative to the tensioner 10 shown in FIG. 1. As a result of the increased magnitude of the normal force N1, the friction force t1 (which depends on the magnitude of the normal force N1) is larger than the friction force t in FIG. 1.

While the damping member 220 may be divided into a first portion 291 and at least one second portion 292 (in this example, a plurality of second portions 292), the first portion 291 does not necessarily have to be rigid, although it is preferable. Also, it will be noted that the second portions 292 need not be flexible. In some embodiments, the second portions 292 could be eliminated, such that the damping member 220 would only contain one portion (i.e. a first portion).

Figure 8A:
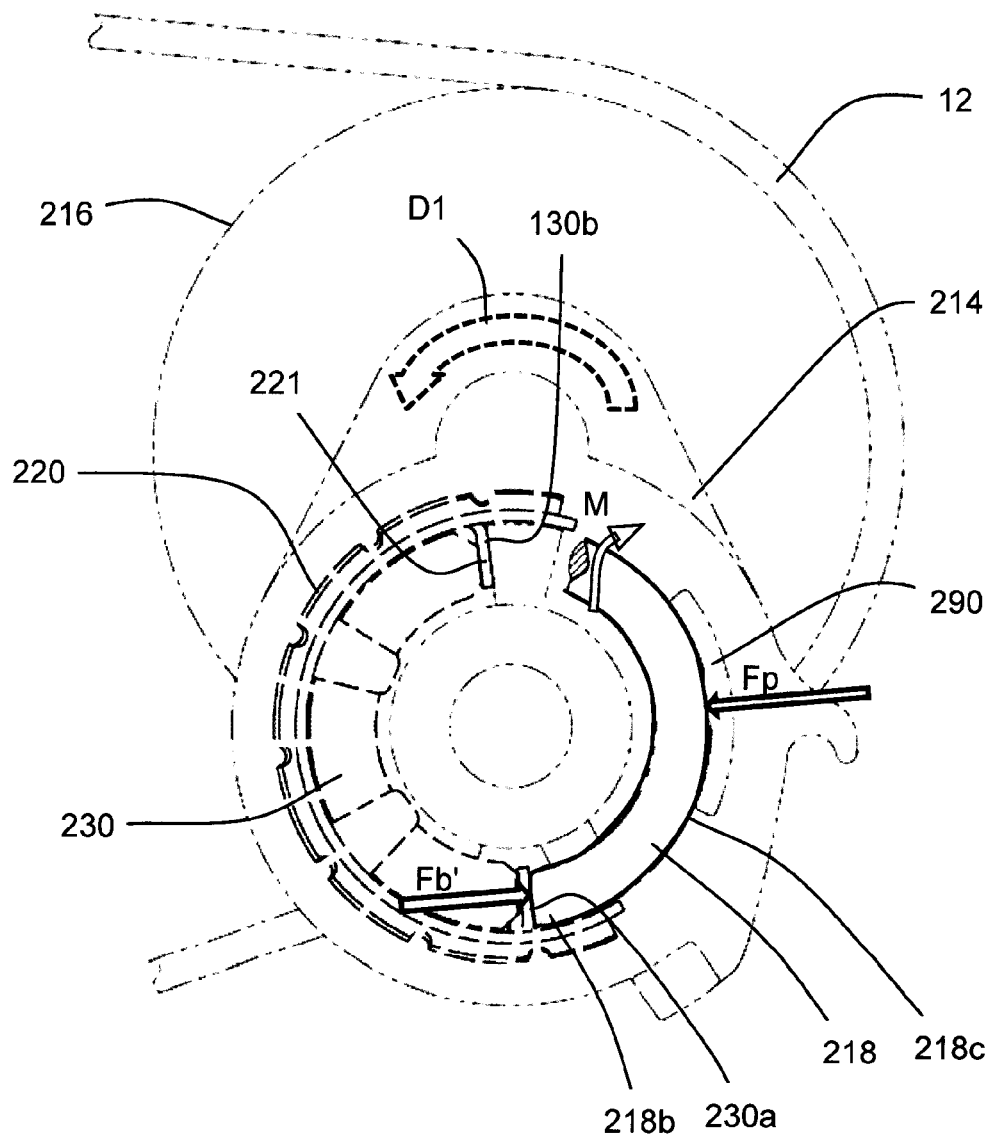
Figure 9A:
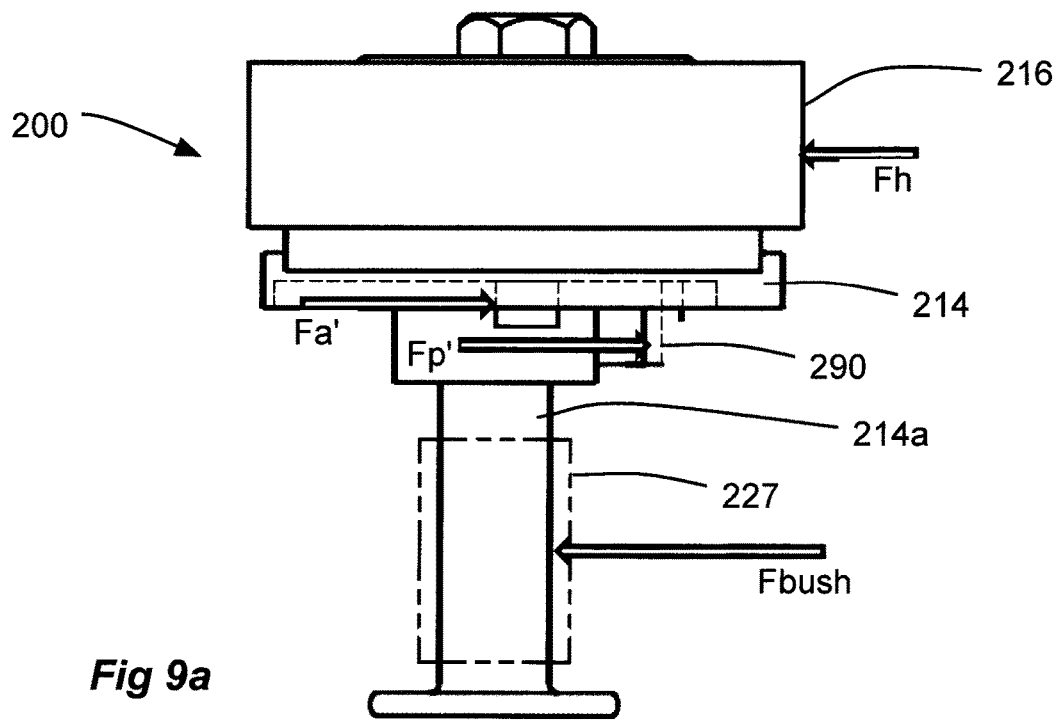
FIGS. 9a and 9b are side views of a portion of the tensioner shown in FIGS. 6a and 6b, illustrating some forces that act on selected elements of the tensioner.
Figure 9B:
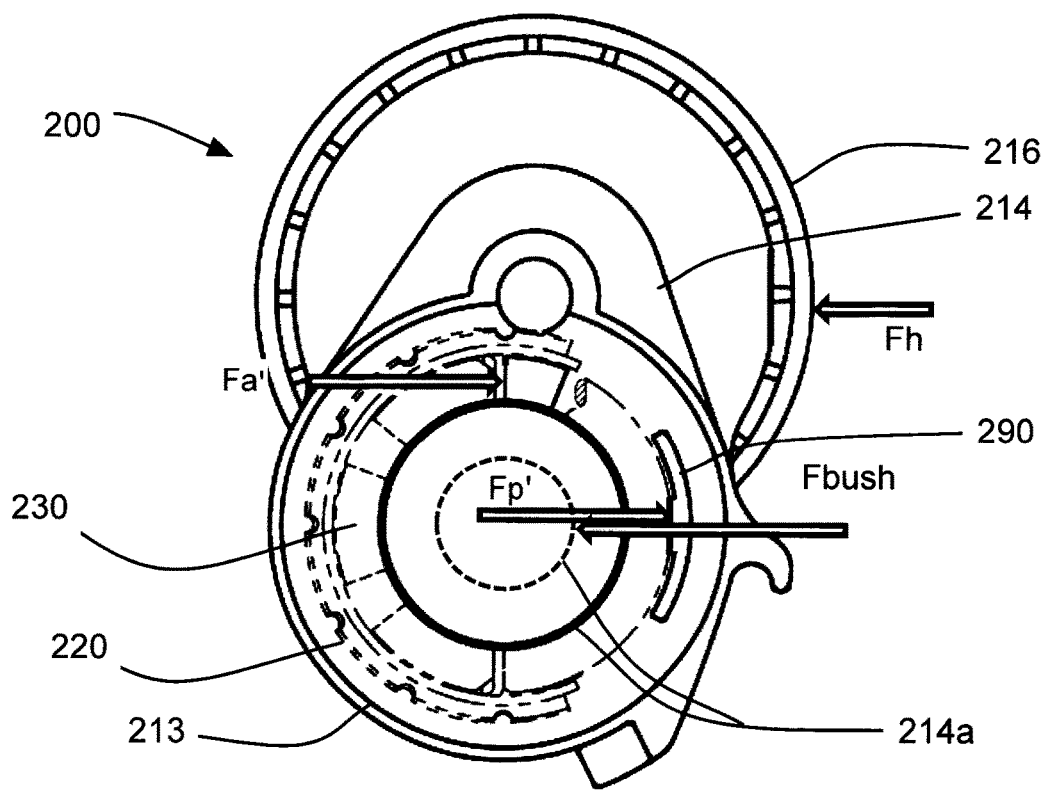

As shown in FIGS. 6b-9b, the tensioner arm 214 may include a spring engagement lip segment 290 that extends axially and circumferentially from the main body of the tensioner arm 214 and that is positioned about 90 degrees from the second spring end 218b. The spring engagement lip segment 290 engages the spring 218 and more particularly, the final coil of the spring 218 that includes the second end 218b. FIG. 8a shows a free body diagram of the spring end portion that includes spring end 218b. There is a reaction force Fb' that is exerted on the spring end 218b from the spring force adjustment member 230 (in reaction to the force Fb exerted by the spring end 218b thereon). To counteract or oppose this force Fb' there is a side force Fp exerted on the spring 218 by the spring engagement lip segment 290. The force Fp may be referred to as a side force because it is exerted on a 'side' of the spring (i.e. the radially outer face shown at 218c), as opposed to the force Fb' which is exerted on the end 218b of the spring 218 and which may be referred to as the end force Fb). FIG. 9a shows a free body diagram of the tensioner arm 214. The tensioner arm 214 incurs a force from the belt 12 through the pulley 216, which is the hub load (Fh). Additionally, it will be understood that the force Fa (FIG. 8) results in an equal and opposite reaction force Fa' (FIG. 9a) exerted on the force transfer surface 221 by the spring force adjustment member 230. Furthermore it will be understood that the force Fp that is exerted on the spring 218 by the spring engagement lip segment 290 results in a reaction force Fp' by the spring 218 on the spring engagement lip segment 290. As shown in FIG. 9a, these three forces (Fa', Fp' and Fh) result in a force Fbush exerted on the shaft 214a by the bushing 227. It can be seen that the force Fbush is generally centered along the length of the bushing 227, which will result in relatively more even wear on the bushing 227 than would occur if the force was exerted near an axial end of the bushing 227, as is the case for bushing 27 in FIG. 2. FIG. 9b shows the same forces but in plan view. The more even wear on the bushing 227 can result in a longer bushing life and a longer operating life for the tensioner 200 overall as compared to the tensioner 10.

Thus, by providing a combination of the spring force adjustment member 230 and the spring engagement lip segment 290, one is able to both increase the damping force (the friction force t1) relative to the tensioner 10 and better balance the bushing load Fbush relative to the tensioner 10.

Throughout this disclosure, the forces that are shown are represented diagrammatically as point loads. It will be understood however, that they are represented and treated that way for simplicity but they are in actuality distributed loads. The force N1 shown in FIG. 5, for example, is somewhat locally distributed due to the rigid nature of the first portion 191 of the damping member 120. The force N2 is also locally distributed.

As shown in the figures, the damping members 120 and 220 may be symmetrical, which permits them to be used in tensioners irrespective of which direction is the spring windup direction. Alternatively, the damping members 120 and 220 may be asymmetrical, as shown by the damping member 120 in FIG. 10*b*.

It will be noted that the damping provided by the damping members 120 and 220 will remain substantially constant over time. This is because, as the damping member 120 or 220 wears, the elements that engage it (e.g. the spring 118 or 218) will simply shift by the small amount necessary to continue to apply force on the damping member 120 or 220 thereby generating friction between the damping member 120 or 220 and the base 113 or 213 as the case may be. This is an improvement over damping members that rely on an interference fit with adjacent components to provide the damping force. In those cases, as the damping member wears the damping force progressively weakens as the amount of interference decreases.

It will be noted that the above structures and methods for achieving increased damping do so without the need to augment the coefficient of friction between the damping member and the base, as compared to that between the damping member 20 and the base 13 in FIGS. 1 and 2. Such coatings can be expensive, can have a relatively large range of tolerances in their resulting friction coefficients, and can significantly change in effectiveness with wear. By contrast, the structures and methods disclosed herein can be relatively consistent, and inexpensive.

While the above description constitutes a plurality of embodiments of the present invention, it will be appreciated that the present invention is susceptible to further modification and change without departing from the fair meaning of the accompanying claims.

The invention claimed is:

1. A tensioner for tensioning an endless drive member on an engine, comprising:
   a base that mounts to a stationary member;
   a tensioner arm that is pivotally connected to the base for pivotal movement about a tensioner arm axis;
   a pulley rotatably mounted to the tensioner arm for rotation about a pulley axis that is spaced from the tensioner arm axis;
   a tensioner spring that is positioned to urge the tensioner arm into an endless drive member, wherein the spring has a first helical end pointing in a circumferential direction and a second helical end pointing in a circumferential direction, wherein the first helical end is positioned to transfer force with a first spring end force transfer surface on the base and the second helical end is positioned to transfer force with a second spring end force transfer surface on the tensioner arm; and
   a damping member positioned in a surrounding relationship with the tensioner spring, wherein the damping member includes a spring force adjustment member having a first end face and a second end face spaced from the first end face by a selected angular spacing, wherein the damping member includes a first portion that contains the spring force adjustment member and that is generally rigid, and at least one second portion that is adjacent the first member and that is flexibly joined to the first member,
   wherein the spring force adjustment member is positioned between and abuts one of the spring first and second helical ends and the spring end force transfer surface on one of the base and the tensioner arm corresponding to the other of the spring first and second helical ends, and wherein the damping member is frictionally engaged with the other of the base and the tensioner arm during pivotal movement of the tensioner arm relative to the base.

2. A tensioner as claimed in claim 1, wherein the spring is a helical torsion spring.

3. A tensioner as claimed in claim 1, wherein the selected angular spacing is about 180 degrees.

4. A tensioner as claimed in claim 2, wherein the helical spring includes a plurality of spring coils, and wherein one of the spring coils proximate the second helical end of the spring engages a spring engagement lip segment on the tensioner arm, such that, in use, an end force is applied between the second end of the spring and the first end face of the spring force adjustment member and a side force is applied between the spring engagement lip segment and a radially outer side face of the spring coil and is generally opposed to the end force.

5. A tensioner as claimed in claim 4, wherein the tensioner arm is pivotally connected to the stationary member via a bushing, and wherein a reaction force from the bushing on the tensioner arm to support the tensioner arm is approximately centered axially on the bushing.

6. A tensioner as claimed in claim 1, wherein the spring force adjustment member is positioned between the second helical spring end and the second spring end force transfer surface on the tensioner arm, and wherein the damping member is frictionally engaged with the base during pivotal movement of the tensioner arm relative to the base.

7. A tensioner as claimed in claim 1, wherein the second portion is flexible.

8. A tensioner as claimed in claim 1, wherein the spring engages the second portion of the damping member and drives the second portion of the damping member into frictional engagement with the other of the base and the tensioner arm during pivotal movement of the tensioner arm relative to the base.

9. A tensioner for tensioning an endless drive member on an engine, comprising:
   a base that mounts to a stationary member;
   a tensioner arm that is pivotally connected to the base for pivotal movement about a tensioner arm axis;
   a pulley rotatably mounted to the tensioner arm for rotation about a pulley axis that is spaced from the tensioner arm axis;
   a tensioner spring that is positioned to urge the tensioner arm into an endless drive member, wherein the spring has a first helical end and a second helical end, wherein the first helical end is positioned to transfer force with a first spring end force transfer surface on the base and the second helical end is positioned to transfer force with a second spring end force transfer surface on the tensioner arm; and a damping member positioned in a surrounding relationship with the tensioner spring, wherein the damping member includes a spring force adjustment member having a first end face and a second end face spaced from the first end face by a selected angular spacing, wherein the spring force adjustment member is positioned between the second helical spring ends and the second spring end force transfer surface on the tensioner arm, and wherein the damping member is frictionally engaged with the base during pivotal movement of the tensioner arm relative to the base, wherein the helical spring includes a plurality of spring coils, and wherein one of the spring coils proximate the second helical end of the spring engages a spring engagement lip segment on the tensioner arm, such that, in use, an end force is applied between the second end of the spring and the first end face of the spring force adjustment member and a side force is applied between the spring engagement lip segment and a radially outer side face of the spring coil and is generally opposed to the end force, and wherein the tensioner arm is pivotally connected to the stationary member via a bushing, and wherein a reaction force from the bushing on the tensioner arm to support the tensioner arm is approximately centered axially on the bushing.

10. A tensioner as claimed in claim 9, wherein the spring is a helical torsion spring.

11. A tensioner as claimed in claim 9, wherein the selected angular spacing is about 180 degrees.

12. A tensioner as claimed in claim 9, wherein the selected angular spacing is between about 90 degrees and about 180 degrees.

13. A tensioner for tensioning an endless drive member on an engine, comprising:
  a base that mounts to a stationary member;
  a tensioner arm that is pivotally connected to the base for pivotal movement about a tensioner arm axis;
  a pulley rotatably mounted to the tensioner arm for rotation about a pulley axis that is spaced from the tensioner arm axis;
  a tensioner spring that is positioned to urge the tensioner arm into an endless drive member, wherein the spring has a first helical end and a second helical end, wherein the first helical end is positioned to transfer force with a first spring end force transfer surface on the base and the second helical end is positioned to transfer force with a second spring end force transfer surface on the tensioner arm; and
  a damping member positioned in a surrounding relationship with the tensioner spring, wherein the damping member includes a spring force adjustment member having a first end face and a second end face spaced from the first end face by a selected angular spacing, wherein the selected angular spacing is between about 90 degrees and about 180 degrees, wherein the damping member includes a first portion that contains the spring force adjustment member and that is generally rigid, and at least one second portion that is adjacent the first member and that is flexibly joined to the first member, wherein the spring force adjustment member is positioned between one of the spring ends and the spring end force transfer surface on one of the base and the tensioner arm, and wherein the damping member is frictionally engaged with the other of the base and the tensioner arm during pivotal movement of the tensioner arm relative to the base.

* * * * *